(12) United States Patent
Ribarich

(10) Patent No.: US 7,557,515 B2
(45) Date of Patent: Jul. 7, 2009

(54) SIMPLIFIED BALLAST CONTROL CIRCUIT

(75) Inventor: Thomas J Ribarich, Laguna Beach, CA (US)

(73) Assignee: International Rectifier Corporation, El Segundo, CA (US)

( * ) Notice: Subject to any disclaimer, the term of this patent is extended or adjusted under 35 U.S.C. 154(b) by 82 days.

(21) Appl. No.: 11/769,516

(22) Filed: Jun. 27, 2007

(65) Prior Publication Data
US 2008/0042595 A1 Feb. 21, 2008

Related U.S. Application Data

(60) Provisional application No. 60/817,239, filed on Jun. 28, 2006.

(51) Int. Cl.
 *H05B 37/02* (2006.01)
(52) U.S. Cl. .................. 315/247; 315/246; 315/209 R; 315/224; 315/225
(58) Field of Classification Search .................. 315/247, 315/246, 209 R, 224, 225, 307–311, 291
 See application file for complete search history.

(56) References Cited

U.S. PATENT DOCUMENTS 6,891,339 B2   5/2005   Ribarich et al.
2006/0006811 A1 *  1/2006   Green et al. ............ 315/209 R

* cited by examiner

*Primary Examiner*—Tuyet Vo
(74) *Attorney, Agent, or Firm*—Farjami & Farjami LLP

(57) ABSTRACT

A ballast control circuit for use with a fluorescent lamp in accordance with an embodiment of the present application includes a voltage controlled oscillator operable to provide an operating signal for the ballast control circuit, wherein a frequency of the operating signal depends on an input voltage provided to the voltage controller oscillator, and a driver circuit operable to provide a first driver signal via a first driver terminal and a second driver signal via a second driver terminal to a first switch and a second switch of a half bridge, respectively, wherein the first switch and the second switch are connected in series across a power source, such that a desired output voltage for powering the fluorescent lamp is provided at a node between the first switch and the second switch. The first control signal and the second control signal control the first switch and the second switch to provide a desired duty cycle and dead time based on the frequency of the operating signal. The input voltage of the voltage controlled oscillator is provided at a power supply terminal of the ballast control circuit and is maintained within a desired range such that the frequency of the operating signal is maintained in a second desired range.

18 Claims, 3 Drawing Sheets

US 7,557,515 B2

SIMPLIFIED BALLAST CONTROL CIRCUIT

CROSS REFERENCE TO RELATED APPLICATIONS

The present application claims benefit of and priority to U.S. Provisional Patent Application Ser. No. 60/817,239 entitled SIMPLE BALLAST CONTROL CIRCUIT filed Jun. 28, 2006, the entire contents of which are hereby incorporated by reference herein.

BACKGROUND OF THE INVENTION

The present invention relates to a simplified ballast control circuit for use with a fluorescent lamp. In particular, the present application relates to a fully functional ballast control circuit with a simplified design that eliminates complexity and cost.

Conventional ballast control circuits include a wide variety of features, however, these circuits tend to be rather complex. For example, conventional ballast control circuits usually set a preheat time and frequency to allow for preheating of the lamp filaments, a frequency sweep from the preheat frequency to the resonance frequency of the resonance output stage such that the lamp ignites and a final run frequency at which the lamp is provided with the correct power for normal operation. These various frequencies are typically generated by the ballast control circuit using a voltage controlled oscillator (VCO) which provides different frequencies for an output operating signal based on a voltage level provided at the input of the VCO. Another timing circuit is usually provided to program the time period during which the operating signal remains at each of the frequencies described above, and yet another circuit is typically provided to program the sweep time between each frequency. Thus, conventional ballast control circuits must include a substantial amount of additional circuitry just to allow for changing of frequencies in the circuit. As a result, conventional ballast control circuits tend to be somewhat complicated, and thus, it is sometimes difficult to determine exactly how they function, which can complicate maintenance and/or trouble shooting. In addition, the complexity of the conventional ballast circuits adds substantial cost to their manufacture.

Accordingly, it would be beneficial to provide an improved ballast control circuit that avoids the problems mentioned above.

SUMMARY OF THE INVENTION

It is an object of the present invention to provide a fully functional ballast control circuit with a simplified design.

A ballast control circuit for use with a fluorescent lamp in accordance with an embodiment of the present application includes a voltage controlled oscillator operable to provide an operating signal for the ballast control circuit, wherein a frequency of the operating signal depends on an input voltage provided to the voltage controller oscillator, and a driver circuit operable to provide a first driver signal via a first driver terminal and a second driver signal via a second driver terminal to a first switch and a second switch of a half bridge, respectively, wherein the first switch and the second switch are connected in series across a power source, such that a desired output voltage for powering the fluorescent lamp is provided at a node between the first switch and the second switch. The first control signal and the second control signal control the first switch and the second switch to provide a desired duty cycle and dead time based on the frequency of the operating signal. The input voltage of the voltage controlled oscillator is provided at a power supply terminal of the ballast control circuit and is maintained within a desired range such that the frequency of the operating signal is maintained in a second desired range.

Other features and advantages of the present invention will become apparent from the following description of the invention which refers to the accompanying drawings.

BRIEF DESCRIPTION OF THE DRAWING(S)

DETAILED DESCRIPTION OF PREFERRED EMBODIMENTS OF THE INVENTION

Figure 1:
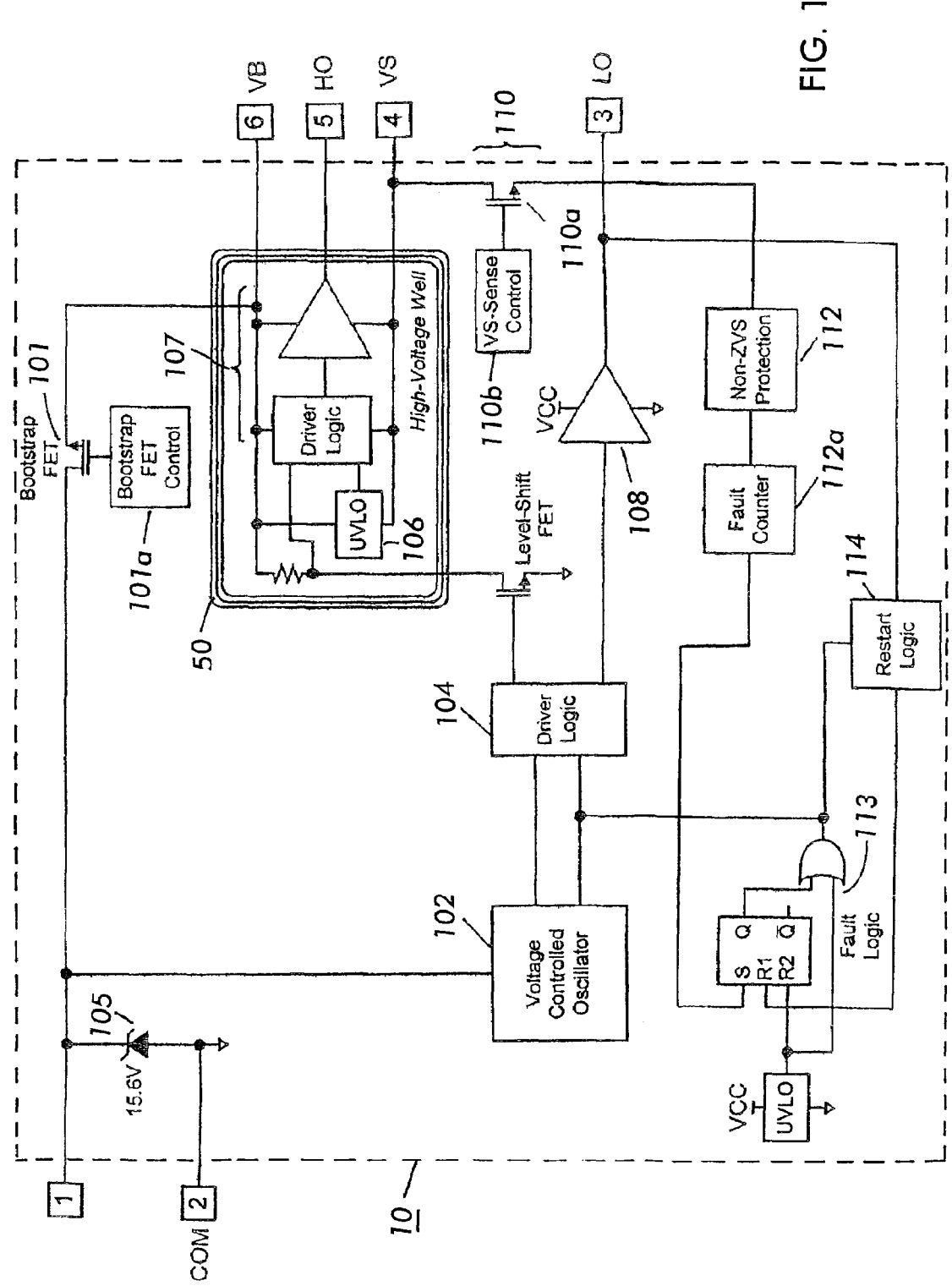
FIG. 1 is a schematic diagram of a ballast control circuit in accordance with an embodiment of the present invention.
Figure 3:
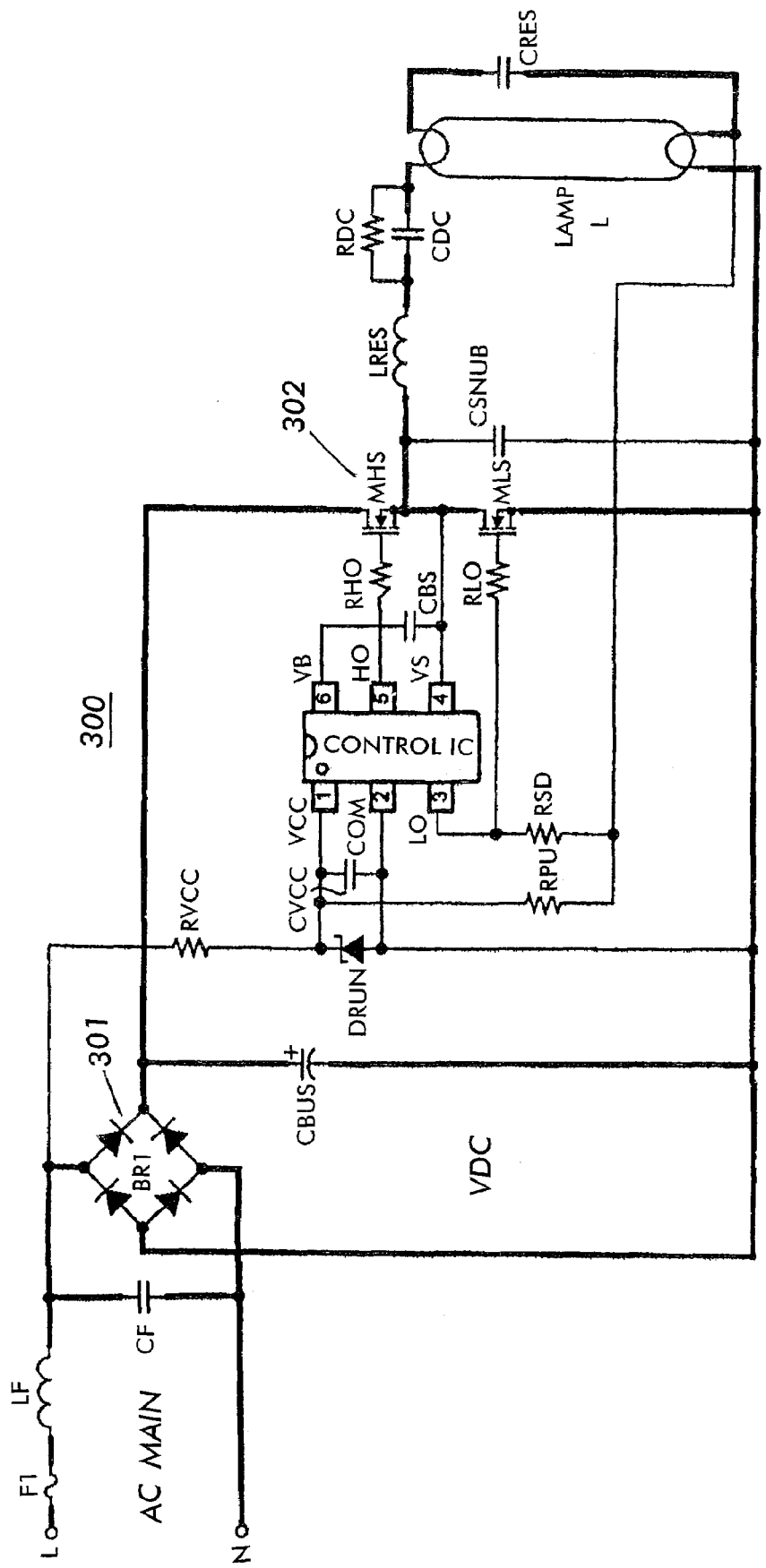
FIG. 3 is schematic diagram of an exemplary application circuit in which the ballast control circuit of FIG. 1 may be used.

A ballast control circuit 10 in accordance with an embodiment of the present application is described with reference to FIG. 1. As illustrated in FIG. 1, the ballast control circuit 10 is preferably implemented as a 6-pin integrated circuit (IC). Terminals 1 and 2 of the IC are designated VCC and COM, respectively and are used to connect the circuit 10 to a power supply to provide a supply voltage to power the control circuit 10, as is illustrated in the exemplary application circuit 300 of FIG. 3. As is also illustrated in FIG. 3, the resistor RVCC drops the supply voltage from the mains which is typically in the range of 200-600 volts to an appropriate level for the to supply the control circuit 10.

In addition, in a preferred embodiment of the present application, the terminal VCC (Terminal 1) is used to control the preheat time, preheat and ignition frequencies and running frequencies in the ballast control circuit 10. In particular, as illustrated in FIG. 1, the terminal VCC is connected to an input of the voltage-controlled oscillator (VCO) 102. The VCO 102 provides an output operating signal with a range of frequencies to the driver logic unit 104. The particular frequency of the operating signal depends on the input to the VCO 102, which in the present application, is the voltage provided at the input supply terminal VCC. The under-voltage lock-out (UVLO) circuit 106 turns the ballast control circuit 10 "on" when the voltage at terminal VCC exceeds a certain preset value (UVLO+) which is typically approximately 10V. The Zener diode 105 clamps the voltage at terminal VCC at a higher voltage, typically about 15V. Thus, the range of the voltage that is provided as an input to the VCO 102 is between 10 and 15 volts. More precisely, the frequency range of the output operating signal provided by the VCO is defined by the rising under voltage lockout threshold (UVLO+) and the Zener diode voltage.

The lower available voltage, UVLO+, when the control circuit 10 first turns ON, corresponds to a higher frequency operating signal. The higher voltage of the Zener diode 105 corresponds to a lower frequency operating signal. The external bypass filter capacitor CVCC and the resistor RPU determine how fast the voltage at the terminal VCC rises, and thus, how fast the frequency of the operating signal sweeps from the higher frequency to the lower frequency. Thus, the voltage at the terminal VCC determines the preheat time and the ignition time, respectively, based on the values of the CVCC and RPU. In addition, the rate of frequency sweep and the final running frequency are also set based on the supply voltage at the terminal VCC.

The terminal VCC, when used in this fashion, may also aid in providing brown-out protection. By supplying the voltage to the terminal VCC directly from the mains, as illustrated in FIG. 3, for example, the voltage at terminal VCC will automatically decrease in the event of a brown-out. As a result, the frequency of the operating signal will shift higher again. When the brown-out period ends, the frequency will then sweep lower through the resonant frequency and the resonant load, or lamp L, will re-ignite. Thus, with a few additional components, the supply voltage at the terminal VCC of the ballast control circuit 10 is used in multiple roles to provide UVLO lockout protection, brown-out protection and to set the preheat time, the preheat and ignition frequencies and the running frequency of the control circuit 10. This alone substantially simplifies the ballast control circuit 10 when compared to conventional ballast control circuits discussed above, for example.

The operating signal from the VCO 102 is provided to the driver logic unit 104 which provides first and second control signals to the high side driver unit 107 and the low side driver unit 108, respectively. The high side driver unit 107 provides a high side driving signal to control the high side MOSFET MHS (See FIG. 3) of the half-bridge 302 via the high side gate driver output HO (Terminal 5). The low side gate driver unit 108 provides a low side driver signal to the low side MOSFET MLS of the half-bridge 302 (See FIG. 3) via the low side gate driver terminal LO (Terminal 3). The high side and low side gate driver signals are provided to the gates of the high side and low side MISFITS MHS, MLS, respectively, to turn them ON and OFF, as desired, to provide power to the fluorescent lamp. The first and second control signals control the ON/OFF state of the high side and low side MISFITS MHS, MLS, to provide the desired duty cycle and dead time. The operation of such driver circuits is well know, and thus, is not discussed in detail herein.

Terminal 6 of the control circuit 10, which is designated VB, is connected to a bootstrap FET 101 which acts as a bootstrap diode and is coupled to terminal VCC. A voltage is provided to the high side driver unit 107 via the terminal VB to power the unit 107. The high side driver unit 107 is preferably provided in a high side well 50, which isolates it from low side circuitry. The bootstrap FET 101 is controlled by a bootstrap control device 101a in a known manner. Terminal 4, designated VS in FIG. 1, is connected to the node A of the half-bridge 302 between the high side (first) and low side (second) MISFITS MHS and MLS, respectively, as can be seen with reference to FIG. 3. The terminal VS is used as a sensing input to sense the voltage at node A. This information may be used to detect faults, as is described further below.

More specifically, a high voltage sensing circuit 110 is provided to sense the voltage at the node A of the half bridge 302 as can be seen with reference to FIGS. 1 and 3. The sensing circuit 110 must be able to block high voltages when node A is connected to the DC bus voltage, that is, when the high side MOSFET MHS is ON. The sensing circuit 110 must also be able to measure the voltage when the voltage at node A drops to a lower voltage, such as during dead time or when the low side MOSFET MLS is ON. The sensing circuit 110 therefore includes sensing MOSFET 110a which is turned OFF, when the high side MOSFET MHS is ON. A non-zero voltage switching (non-ZVS) detection circuit 112 is provided in order to determine whether non-ZVS is occurring. Specifically, the voltage at node A is provided to the detection circuit 112 via the switching MOSFET 110a when the high side MOSFET MHS is OFF, the switching MOSFET 110a is ON, and preferably during the dead time. The detection circuit 112 determines whether the voltage at node A is close to zero when the dead time ends and the low side MOSFET MLS is turned ON. If the voltage at node A at this time is above a predetermined non-NVS threshold, preferably 15 V, for several consecutive events, typically about 50, a fault condition is triggered. That is, the fault counter 112a sends a fault signal to the fault logic 113 and a fault is triggered such that the control circuit 10 is deactivated before any damage can occur.

In addition, the detection of non-ZVS also allows for non-strike protection. That is, detecting non-ZVS may indicate that the lamp L has not been lit. When the operating frequency provided by the VCO 102 passes through the resonance frequency for the lamp and the lamp does not light, the frequency will continue to increase to the capacitive side of the resonance and non-ZVS will occur. This non-ZVS is detected by the circuit 112, as described above, and the control circuit 10 is deactivated before damage results.

The non-ZVS protection provided by the detection circuit 112 is also useful in detecting open lamp filaments or lamp removal. If a lamp filament opens during normal operation, the resonant tank load circuit will become interrupted and no half-bridge current flows. As a result, the half-bridge voltage will not commute during the dead time and non-ZVS will occur. The non-ZVS detection circuit 112 will detect the non-ZVS and will shut down the circuit 10 as mentioned above. Further, if the removal of a lamp interrupts the tank circuit, then the same conditions result as described above and non-ZVS occurs. This non-ZVS is detected by the circuit 112 and the circuit 10 is shut down. In addition, if the lamp terminals are shorted such that the resonance inductor and resonant capacitor are always connected together, the tank circuit will operate on the capacitive side of resonance, which will result in non-ZVS. In this manner, the sensing circuit 110 and non-ZVS detection circuit 112 provide non-ZVS protection and also acts to detect other lamp faults and to deactivate the ballast control circuit 10 prior to the occurrence of any damage.

A lamp restart circuit 114 is also provided in the ballast control circuit 10. The restart circuit 114 detects when a lamp is removed and restarts the control circuit 10 when it is replaced. The circuit 114 uses the low side gate driver terminal LO as an input rather than an output under certain circumstances. During normal operation, if a lamp is removed, the non-ZVS protection circuit 112 detects the missing lamp, as noted, above and deactivates the ballast control circuit 10. Once the circuit is deactivated. The voltage at the high side gate driver terminal HO is held "low" to ensure that the high side MOSFET MHS stays OFF. However, the voltage at the low side gate driver terminal LO can be allowed to float. Thus, the low side gate driver terminal LO can be used as an input during fault mode or UVLO mode. As illustrated in FIG. 3, the low side gate driver terminal LO is preferably connected to the lower lamp L filament via the resistor RSD. If the lamp is not present, the voltage at the terminal LO will rise. When the voltage of the low side gate driver terminal LO exceeds a threshold, typically 5V, the circuit 10 enters UVLO Mode. When a lamp is reinserted, the voltage at the terminal LO is brought back down by its connection to the COM pin via the lower lamp filament. When the low side gate driver terminal LO drops below a lower threshold, typically 4.7 volts, the circuit exits UVLO mode and the frequency begins sweeping as described above. The ballast then begins to preheat and ignites the lamp again. Thus, using the low side gate driver terminal LO as an input during Fault Mode and UVLO Mode allows for restart of the control circuit 10 with a simpler circuit configuration.

Figure 2:
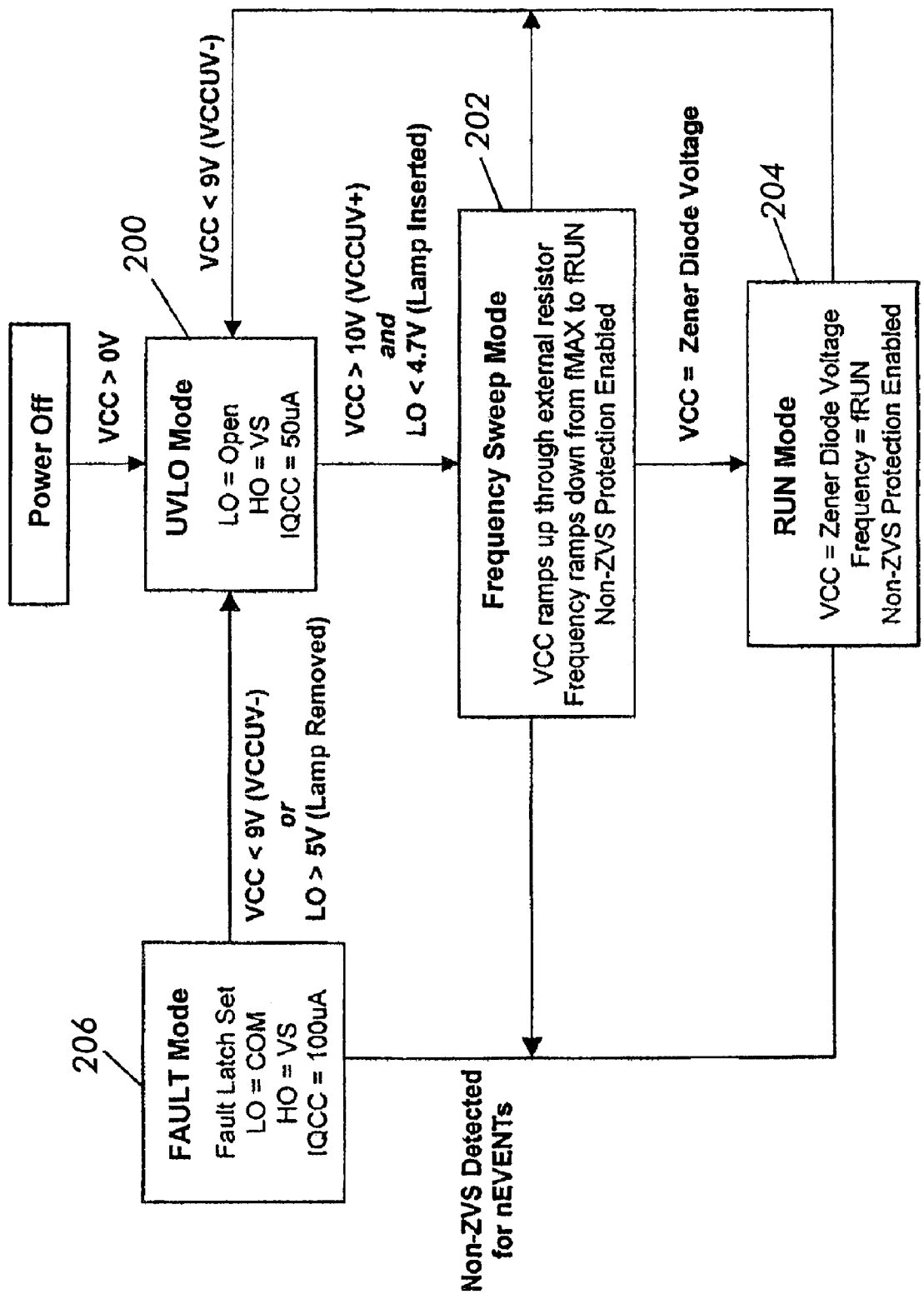
FIG. 2 is a state diagram illustrating the operational modes of the ballast control circuit of FIG. 1.

FIG. 2 is a state diagram that illustrates the modes in which the control circuit 10 operates. Typically, when the power is turned on, the circuit 10 will first enter UVLO mode 200. In UVLO Mode 200, the voltage at the high side gate terminal HO stays "low" such that the high side MOSFET MHS is OFF. The low side gate terminal LO is allowed to float, as noted above such that the presence, or absence, of the lamp can be detected. As the voltage at terminal VCC rises above the lockout threshold (UVLO+), usually 10 V, as mentioned above, the circuit 10 enters frequency sweep mode 202. In Frequency Sweep Mode 202, the circuit begins oscillating at a high frequency. At this point, the low side gate driver terminal LO is used as an output to provide the low side driver signal to the low side MOSFET MLS and the half bridge 302 is oscillating at a given duty cycle and dead time and at a frequency determined by the value at the terminal VCC. The frequency sweeps down as the voltage at VCC ramps up. The frequency sweeps through the preheat frequency range such that the lamp filaments preheat as the lamp voltage increases toward the resonant frequency of ignition. When the voltage across the lamp L exceeds the threshold voltage for ignition, the lamp ignites. The frequency continues to decrease until the voltage at terminal VCC reaches a maximum supply voltage as set by the Zener diode 105. The circuit 10 preferably stays in the final Run Mode 204. During Frequency Sweep Mode 202, or Run Mode 204, however, if non-ZVS occurs, as detected by the non-ZVS detection circuit 112 for a number of consecutive events, usually 50, due to lamp or ballast fault, the circuit enters fault mode 206. The circuit 10 will exit fault mode if the voltage at VCC drops below a negative lockout threshold (UVLO−), typically 9V, such that UVLO Mode 200 is entered again. Alternatively, if the value on the low side gate driver terminal LO, which is used as an input in Fault Mode 206, exceeds the restart threshold of 5V, Fault Mode 206 ends and UVLO Mode 200 begins again. In either of these cases, the fault latch of the fault logic 113 is released, and the control circuit 10 returns to UVLO mode 200.

As illustrated in FIG. 3, the ballast control circuit 10 is preferably used in conjunction with a rectifier 301, which may be a full bridge rectifier as shown in FIG. 3 or any other suitable rectifier. The rectifier 301 is preferably used to rectify the AC main line voltage to provide a DC Bus voltage (VDC) across the bus capacitor CBUS, for example. The DC voltage is used by the half bridge 302 to provide power to the lamps L. The half-bridge 302 is provided across the DC Bus and includes a high side, or first, switch MHS and a low side, or second, switch MLS connected in series in a known manner. A node A is provided between the switched MHS and MLS of the half bridge 302 from which a driving voltage is provided to the lamp L. The rectifier 301, lamp L and associated circuitry operate is substantially the same manner as they would with a conventional ballast control circuit. While the application circuit 300 of FIG. 3 illustrates an exemplary circuit in which the ballast control circuit 10 of the present application may be used, the present invention is not limited to use in this circuit.

The ballast control circuit 10 of the present application thus utilizes the supply terminal VCC as an input to the VCO 102, thus eliminating the need for another voltage supply to provide the input to the VCO. Further, the high voltage sensing circuit 110 of the circuit 10 is used in conjunction with the non-ZVS detection circuit 112 to detect non-ZVS, as well as other lamp faults during operation. In addition, the low side gate driver terminal LO is used as an input during Fault Mode or UVLO mode to aid in lamp restart. Thus, by combining the roles of these pins, or terminals, of the ballast control circuit 10 can be implemented as a control IC that requires only 6 pins. Further, this 6-pin package may be implemented in a tiny 6 pin SOT-23 package, which is not possible for conventional ballast control circuits.

Thus, the ballast control circuit 10 of the present application utilizes the VCC terminal as an input to the VCO with a resistor, capacitor and Zener diode provided at the VCC terminal to program the preheat time, preheat and ignition frequencies and a running frequency. High voltage sensing circuitry 110 is provided to allow for the measurement of the voltage at the switching node A between the high side and low side switches MHS, MLS of the half-bridge 302. The voltage is provided to non-ZVS detection circuit 112 to protect against lamp non-strike, open lamp filaments, lamp removal and short circuit. The VCC terminal may also be used to provide brown-out and mains interrupt reset functionality. Further, the low side gate driver terminal LO may be used as an input during Fault or UVLO Modes to allow for a simple restart circuit 114. These features allow the control circuit 10 to be fully functional and yet substantially simplified when compared to convention ballast control circuits that provide similar functionality.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A ballast control circuit for use with a fluorescent lamp comprising:
   a voltage controlled oscillator operable to provide an operating signal for the ballast control circuit, wherein a frequency of the operating signal depends only on an input voltage provided to the voltage controlled oscillator; and
   a driver circuit operable to provide a first driver signal via a first driver terminal and a second driver signal via a second driver terminal to drive a first switch and a second switch of a half bridge, respectively, wherein the first switch and the second switch are connected in series across a power source, such that a desired output voltage for powering the fluorescent lamp is provided at a node between the first switch and the second switch, wherein the first control signal and the second control signal control the first switch and the second switch to provide a desired duty cycle and dead time based on the frequency of the operating signal, and wherein
   the input voltage to the voltage controlled oscillator is provided at a power supply terminal providing a supply voltage to the ballast control circuit and is maintained within a desired range such that the frequency of the operating signal is maintained in a second desired range.

2. The ballast control circuit of claim 1, further comprising an under voltage lockout circuit operable to disable the ballast control circuit when the supply voltage is below a lockout threshold.

3. A ballast control circuit for use with a fluorescent lamp comprising:
   a voltage controlled oscillator operable to provide an operating signal for the ballast control circuit, wherein a frequency of the operating signal depends on an input voltage provided to the voltage controlled oscillator; and
   a driver circuit operable to provide a first driver signal via a first driver terminal and a second driver signal via a second driver terminal to drive a first switch and a second switch of a half bridge, respectively, wherein the first switch and the second switch are connected in series across a power source, such that a desired output voltage for powering the fluorescent lamp is provided at a node between the first switch and the second switch, wherein the first control signal and the second control signal control the first switch and the second switch to provide a desired duty cycle and dead time based on the frequency of the operating signal, and wherein the input voltage to the voltage controlled oscillator is provided at a power supply terminal of the ballast control circuit and is maintained within a desired range such that the frequency of the operating signal is maintained in a second desired range;

further comprising an under voltage lockout circuit operable to disable the ballast control circuit when the supply voltage is below a lockout threshold;

further wherein the frequency of the operating signal is at a maximum just after the supply voltage exceeds the lockout threshold and wherein the maximum frequency corresponds to a preheat frequency for the half bridge that allows the fluorescent lamp to preheat.

4. The ballast control circuit of claim 3, further comprising a Zener diode connected between the supply terminal and a common return terminal of the ballast control circuit, wherein the Zener diode clamps the voltage at the supply terminal at a predetermined maximum supply voltage.

5. The ballast control circuit of claim 4, wherein the frequency of the operating signal when the voltage at the supply terminal reaches the predetermined maximum supply voltage corresponds to a run frequency at which the fluorescent lamp operates most efficiently.

6. The ballast control circuit of claim 5, further comprising a filtering capacitor connected between the supply terminal and the common return terminal, wherein a capacitance of the filtering capacitor determines a rate of change of the voltage at the supply terminal.

7. The ballast control circuit of claim 6, further comprising a non-zero voltage switching detection circuit operable to determine whether the voltage at the node between the first switch and the second switch is zero when the second switch turns ON.

8. The ballast control circuit of claim 7, wherein the non-zero voltage switching detection circuit provides a non-zero switch signal when the voltage at the node between the first and second switches is above zero for a predetermined number of events.

9. The ballast control circuit of claim 8, further comprising a sensing circuit operable to sense a node voltage at the node between the first and second switches, wherein the sensing circuit is connected to the node via a sensing terminal of the ballast control circuit.

10. The ballast control circuit of claim 9, wherein the sensing circuit further comprises:
   a sensing switch operable to selectively connect the sensing terminal to the non-zero voltage switching detection circuit; and
   a sensing control device, operable to turn the sensing switch on and off, wherein the sensing switch connects the sensing terminal to the non-zero voltage switching detection circuit when the sensing switch is on; and
   wherein the sensing control device turns the sensing switch off, when the first switch is on.

11. The ballast control circuit of claim 10, further comprising fault logic operable to indicate a fault in at least one of the half bridge and the fluorescent lamp, wherein the fault logic deactivates the ballast control circuit when the fault is indicated.

12. The ballast control circuit of claim 11, wherein the fault logic is connected to the non-zero voltage switching detection circuit and the fault logic indicates a fault when the non-zero voltage switching detection circuit provides the non-zero switch signal.

13. The ballast control circuit of claim 12, further comprising a restart circuit operable to restart the ballast control circuit after the fluorescent lamp is replaced.

14. The ballast control circuit of claim 13, wherein the restart circuit is connected to a filament of the fluorescent lamp via the second driver output terminal, such that the restart circuit provides a restart signal when the voltage at the second driver output exceeds a restart threshold.

15. The ballast control circuit of claim 14, wherein the restart signal is provided to the fault logic such that the fault logic is reset when it receives the restart signal and the ballast control circuit is re-activated.

16. The ballast control circuit of claim 15, wherein the ballast control circuit is implemented as an integrated circuit.

17. The ballast control circuit of claim 15, wherein the ballast control circuit is implemented as a 6-pin integrated circuit.

18. The ballast control circuit of claim 15, wherein the ballast control circuit is implemented as a 6-pin SOT-23 integrated circuit package.

* * * * *